United States Patent
Tanaka (10) Patent No.: US 8,817,256 B2
(45) Date of Patent: *Aug. 26, 2014

(54) MEDIUM-PRESSING DEVICE AND MALFUNCTION DETECTION METHOD FOR DETECTING MALFUNCTION BASED ON DISPLACEMENT IN POWER SUPPLY

(75) Inventor: Takayuki Tanaka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 308 days.

This patent is subject to a terminal disclaimer.

(21) Appl. No.: 13/188,939

(22) Filed: Jul. 22, 2011

(65) Prior Publication Data

US 2012/0026500 A1   Feb. 2, 2012

(30) Foreign Application Priority Data

Jul. 28, 2010   (JP) ................................ 2010-169012

(51) Int. Cl.
*G01J 3/46* (2006.01)
*H04N 1/60* (2006.01)
*B41J 11/00* (2006.01)
*B41J 29/38* (2006.01)

(52) U.S. Cl.
CPC .......... *B41J 11/0045* (2013.01); *H04N 1/6033* (2013.01); *B41J 29/38* (2013.01)
USPC ...................................................... 356/402

(58) Field of Classification Search
CPC ....... B41J 2/0451; B41J 29/38; H04N 1/6033
USPC ...................................................... 356/402
See application file for complete search history.

(56) References Cited

U.S. PATENT DOCUMENTS

| 5,823,525 | A | 10/1998 | Miki |
| 2002/0036778 | A1 | 3/2002 | Wagner et al. |
| 2006/0214512 | A1* | 9/2006 | Iwata ............................. 307/44 |
| 2008/0252948 | A1 | 10/2008 | Onishi |
| 2010/0127451 | A1* | 5/2010 | Rozenfeld et al. ............ 271/256 |
| 2011/0025368 | A1 | 2/2011 | Tsuchiya |
| 2012/0023382 | A1* | 1/2012 | Sandhu et al. ................ 714/734 |

FOREIGN PATENT DOCUMENTS

| JP | 63-295327 A | 12/1988 |
| JP | 09-030663 A | 2/1997 |
| JP | 2005-082380 A | 3/2005 |
| JP | 2008-275587 A | 11/2008 |
| JP | 2008-281549 A | 11/2008 |

* cited by examiner

*Primary Examiner* — Tarifur Chowdhury
*Assistant Examiner* — Michael P Lapage
(74) *Attorney, Agent, or Firm* — Global IP Counselors, LLP (57) ABSTRACT

To provide a medium-pressing device whereby it is possible to detect a malfunction of a power supply that outputs power for the purpose of pressing a medium. The invention is a medium-pressing device characterized by including a pressing member that presses a medium; a power supply that outputs power for the pressing member to press the medium; a detection section that detects displacement of an output section of the power supply; and a controller adapted to reduce the power output by the power supply from a state in which the pressing member presses the medium, and to detect malfunction of the power supply on the basis of detection results obtained from the detection section.

10 Claims, 10 Drawing Sheets

MEDIUM-PRESSING DEVICE AND MALFUNCTION DETECTION METHOD FOR DETECTING MALFUNCTION BASED ON DISPLACEMENT IN POWER SUPPLY

CROSS-REFERENCE TO RELATED APPLICATIONS

This application claims priority to Japanese Patent Application No. 2010-169012 filed on Jul. 28, 2010. The entire disclosure of Japanese Patent Application No. 2010-169012 is hereby incorporated herein by reference.

BACKGROUND

1. Technological Field

The present invention relates to a medium-pressing device for pressing a medium, and to a malfunction detection method.

2. Background Technology

One example of a known medium-pressing device for pressing a medium is a mechanism for pressing a medium provided with a paper supply device whereby a bottom plate of plate form on which a paper medium rests is pressure-contacted against a roller disposed in opposition to the bottom plate through operation of a pressure application lever constituting an upward-pushing member which contacts the outer plate and which is movable in the vertical direction (see Patent Citation 1, for example).

Japanese Patent Application Publication No. 9-30663 (Patent Citation 1) is an example of the related art.

SUMMARY

Problems to be Solved by the Invention

However, a problem with a mechanism such as the afore-described for pressing a medium is an inability to verify whether accurate pressure-contacting, specifically, pressing with an appropriate level of pressing force, is taking place.

With the foregoing in view, it is one of the advantages of the invention to provide a medium-pressing device and a malfunction detection method whereby it is possible to detect the state of pressing of a medium.

Means Used to Solve the Above-Mentioned Problems

The invention principally resides in a medium-pressing device characterized by including a pressing member for pressing a medium; a power supply for outputting power for the pressing member to press the medium; a detection section for detecting displacement of an output section of the power supply; and a controller for reducing the power output by the power supply from a state in which the pressing member presses the medium, and for detecting a malfunction of the power supply on the basis of detection results obtained from the detection section.

Other features of the invention will be apparent from the disclosure of the present Specification and the appended drawings.

BRIEF DESCRIPTION OF THE DRAWINGS

Referring now to the attached drawings which form a part of this original disclosure.

DETAILED DESCRIPTION OF EXEMPLARY EMBODIMENTS

At a minimum, the following will be apparent from the disclosure of the present Specification and the appended drawings.

There will be apparent a medium-pressing device characterized by including a pressing member for pressing a medium; a power supply for outputting power for the pressing member to press the medium; a detection section for detecting displacement of an output section of the power supply; and a controller for reducing the power output by the power supply from a state in which the pressing member presses the medium, and for detecting a malfunction of the power supply on the basis of detection results obtained from the detection section.

According to this medium-pressing device, malfunction of the power supply can be detected on the basis of detection results obtained from the detection section, in a state with the pressing member remaining disposed at the pressing position.

In preferred practice, the medium-pressing device has a transmission section for reducing the power of the power supply and transmitting the power to the pressing member. Also, in preferred practice, the device has a transmission section for reducing displacement of the output section of the power supply while displacing the pressing member, and for increasing displacement of the pressing member while displacing the output section. In so doing, displacement of the output section of the power supply is greater, and malfunction of the power supply is easily detected.

In preferred practice, the medium-pressing device is a medium-pressing device furnished to a color measurement device which is provided with a color measurement section for performing color measurement of a printed pattern printed onto the medium; and the controller causes the pressing member press the medium when color measurement of the printed pattern is performed by the color measurement section. In so doing, accurate color measurement can take place.

In preferred practice, in the medium-pressing device, the color measurement section rests on the pressing member when color measurement of the printed pattern is performed by the color measurement section. In so doing, the distance between the color measurement section and the medium is kept constant, making accurate color measurement possible.

In preferred practice, in the medium-pressing device, while the color measurement section is resting on the pressing member, the controller reduces the power output by the power supply for the purpose of detecting a malfunction of the power supply. In so doing, the medium can be maintained in the pressed state even when the power output by the power supply has been reduced.

In preferred practice, in the medium-pressing device, while the color measurement section is performing color measurement of the printed pattern, the controller reduces the power output by the power supply for the purpose of detecting a malfunction of the power supply. In so doing, the color measurement process can be completed quickly.

There will also be apparent a malfunction detection method, characterized by having a causing a medium to be pressed by a pressing member using power output by a power supply; and reducing the power output by the power supply from a state in which the pressing member presses the medium, and of detecting a malfunction of the power supply on the basis of the detection results obtained from a detection section for detecting displacement of the output section of the power supply.

According to this method, malfunction of the power supply can be detected on the basis of detection results obtained from the detection section, in a state with the pressing member remaining disposed at the pressing position.

Schematic of Printer 1 Provided with Color Measurement Device

Figure 1:
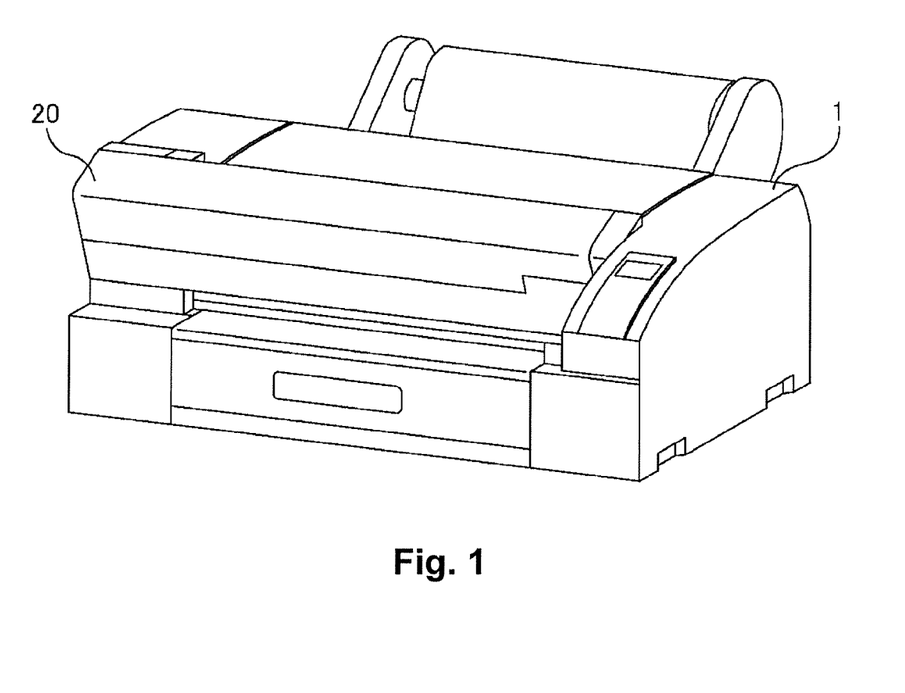
FIG. 1 is a perspective view depicting a printer provided with a color measurement device according to the present embodiment.
Figure 2:
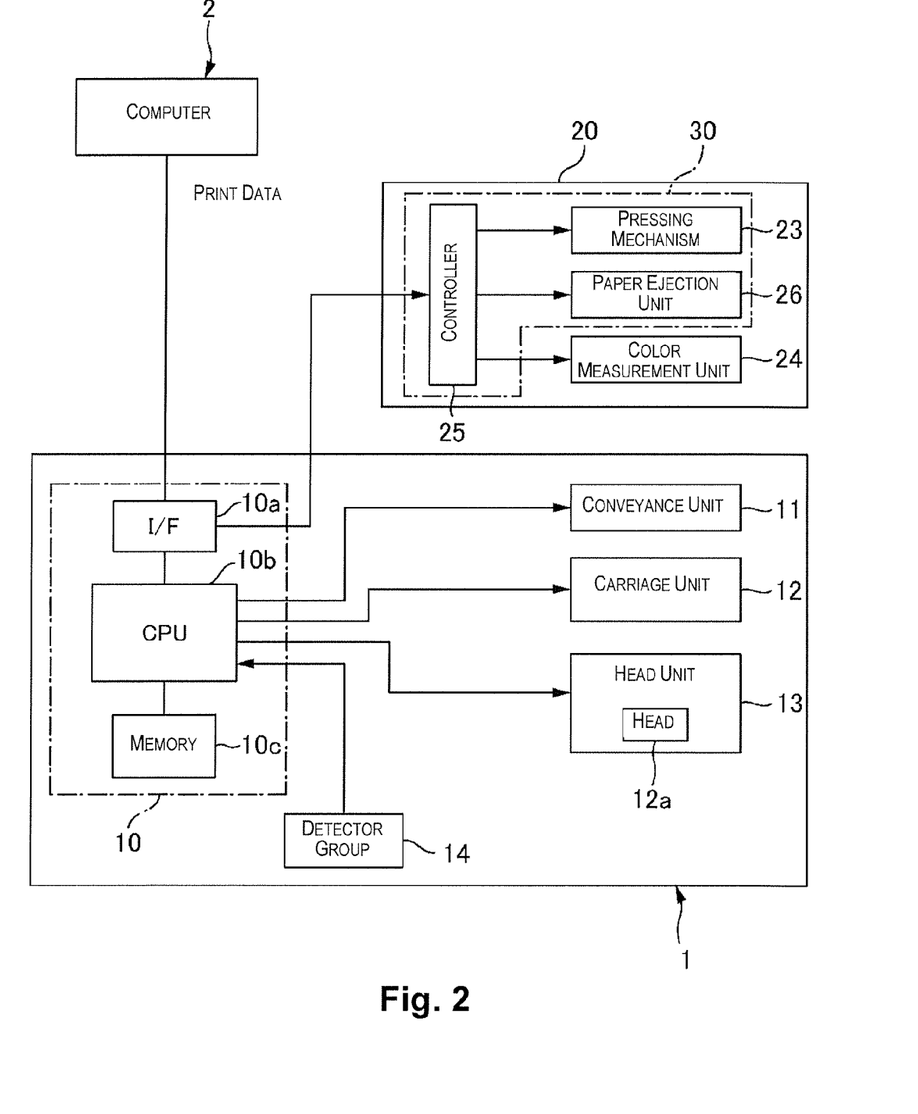
FIG. 2 is a general schematic block diagram of the printer provided with the color measurement device of the present embodiment.
Figure 3:
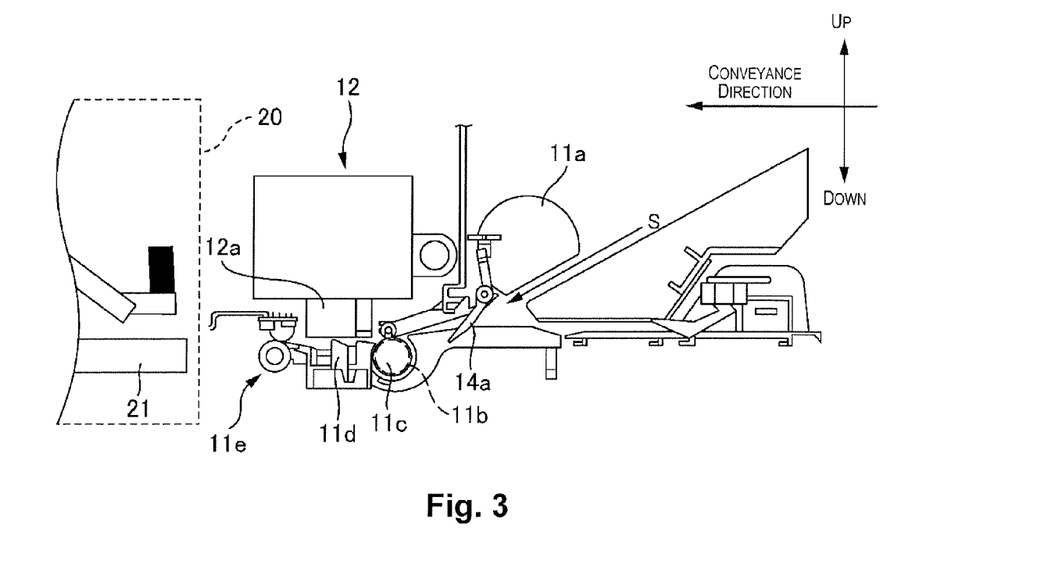
FIG. 3 is a longitudinal sectional view depicting the configuration of the printer of the present embodiment.

FIG. 1 is a perspective view of a printer provided with a color measurement device having a paper-pressing device as the medium-pressing device according to the present embodiment. FIG. 2 is a general schematic block diagram of the printer 1 provided with a color measurement device having the paper-pressing device of the present embodiment. FIG. 3 is a longitudinal sectional view depicting the configuration of the printer 1 of the present embodiment. First, the basic configuration of a printer provided with a color measurement device having the paper-pressing device according to the invention is described briefly. As depicted in FIG. 3, the color measurement device 20 is disposed to the downstream end from a paper ejection roller unit 11e in the conveyance direction of the printer 1.

As an example of a printing device provided with the color measurement device 20 according to the invention, taking the example of an inkjet printer (hereinafter also called a printer) 1 that ejects ink from nozzles and that is furnished with the color measurement device 20 as an option as depicted in FIG. 1, there shall be described an embodiment of a printing system in which the printer 1 provided with the color measurement device 20 having a paper pressing device 30 as the medium-pressing device is connected to a computer 2 as depicted in FIG. 2.

Configuration of Printer 1

As depicted in FIG. 2, in the printer 1 of the present embodiment, print data is received from an external device, namely, the computer 2; and with a number of units (a conveyance unit 11, a carriage unit 12, and a head unit 13) being controlled by a control section 10, an image is formed on a medium of paper S. Events inside the printer 1 are monitored by a detector group 14, with the control section 10 controlling the units on the basis of the detected results thereof.

The control section 10 is a control unit for carrying out control of the printer 1. The purpose of an interface section 10a is to carry out sending and receiving of signals among the external device, i.e., the computer 2, the color measurement device 20, and the printer 1. The purpose of a memory 10c is to ensure a region for a CPU 10b to save programs, a work region, etc. As regards the CPU 10b, in accordance with a computer program (firmware or the like) stored in the memory 10c, the CPU 10b controls the conveyance unit 11 and the carriage unit 12, for example. The printer 1 of the present embodiment is configured such that, in a case where a given operation of a device connected via the interface section 10a, or of an internal electronic component of the printer 1, is detected to have continued for a predetermined time, error information is communicated, and control of the printer 1 is halted. Here, the predetermined time is set to a time for which no electronic component would continue a given operation during normal operation of the printing device, for example, to 30 seconds.

As depicted in FIG. 3, the purpose of the conveyance unit 11 is to infeed the paper S to a printable position, then convey the paper S by a predetermined conveyance amount in the conveyance direction during printing; the unit has a paper supply roller 11a, a conveyance motor 11b, a conveyance roller 11c, a platen 11d, and a paper ejection roller unit 11e. The paper supply roller 11a rotates and sends the paper S to be printed to the conveyance roller 11c. Once a paper supply sensor 14a detects the position of the leading edge of the paper S sent from the paper supply roller 11a, the control section 10 rotates the conveyance roller 11c and positions the paper S at the printing start position. Once the paper S is positioned at the printing start position, at least some of the nozzles of a head 12a are in opposition to the paper S.

The purpose of the carriage unit 12 is to transport the head 12a in an intersection direction (hereinafter also called the transport direction) that intersects the conveyance direction. In the present printer 1, it is possible to eject ink from any of the nozzles during transport in either direction in the transport direction.

With the printer 1 of the present embodiment, it is possible to print out printed patterns of various types on the basis of print data sent from the computer 2, or of internally stored print data. The printed patterns are, for example, printed patterns for making density adjustments or printing position adjustments of the printer 1, and are composed of a plurality of sub-patterns lined up in a direction constituting the conveyance direction of the paper S.

Configuration of Color Measurement Device 20

Figure 4:
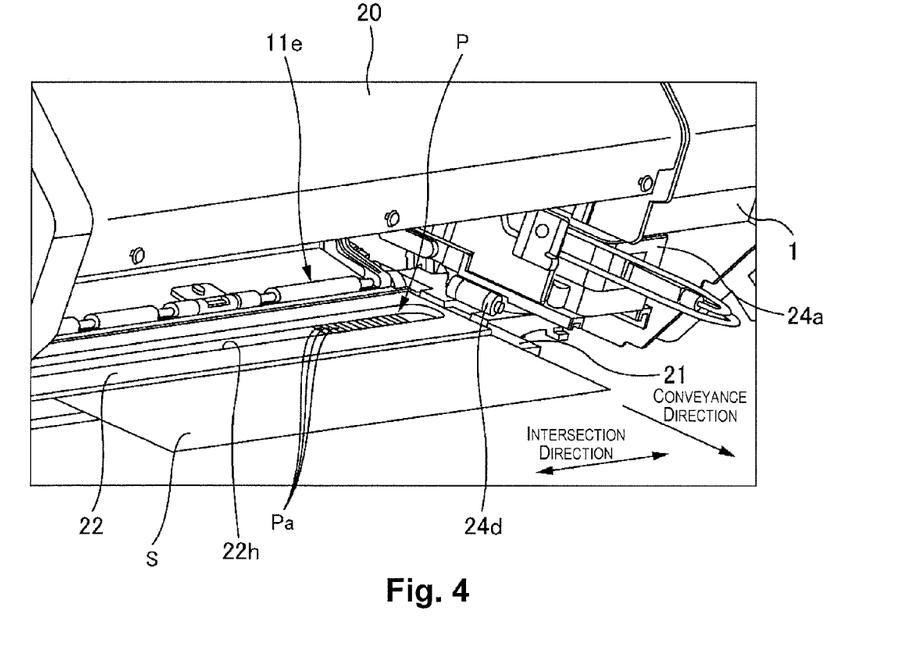
FIG. 4 is a perspective view of the color measurement device of the present embodiment viewed from the paper ejection unit end of the printer.

FIG. 4 is a perspective view of the color measurement device of the present embodiment viewed from the paper ejection unit end of the printer.

For the purpose of color measurement of a printed pattern P that has been printed by the printer 1, the color measurement device 20 of the present embodiment is configured such that the paper S ejected from the paper ejection roller unit 11e of the printer 1 is conveyed to the color measurement position of the color measurement device 20 as depicted in FIGS. 3 and 4. The printing pattern P of the present embodiment includes a plurality of sub-patterns Pa of different color or density disposed lining up in an intersection direction that intersects the conveyance direction of the paper S. The color measurement device 20 performs color measurement of the plurality of sub-patterns Pa at a color measurement position to the downstream end from the paper ejection roller unit 11e of the printer 1. In FIG. 4, some of the reference numerals of the sub-patterns Pa are omitted.

Figure 5:
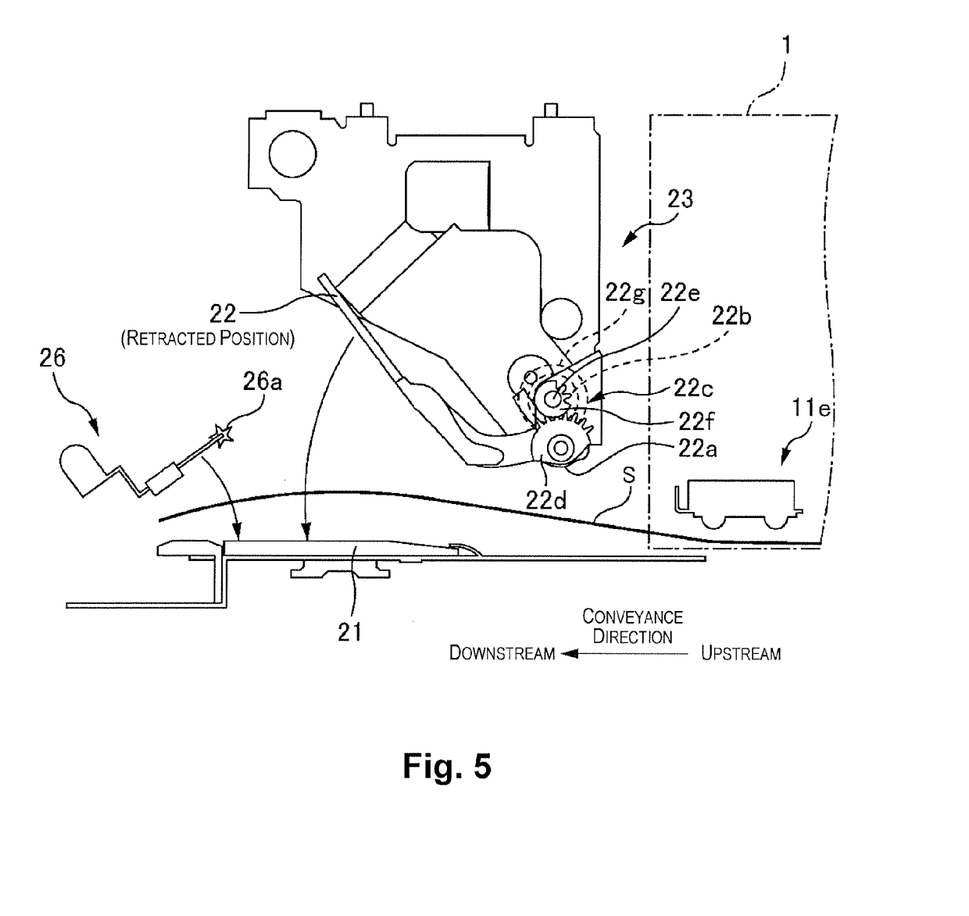
FIG. 5 is a diagram depicting a simplified schematic of a pressing mechanism.
Figure 6:
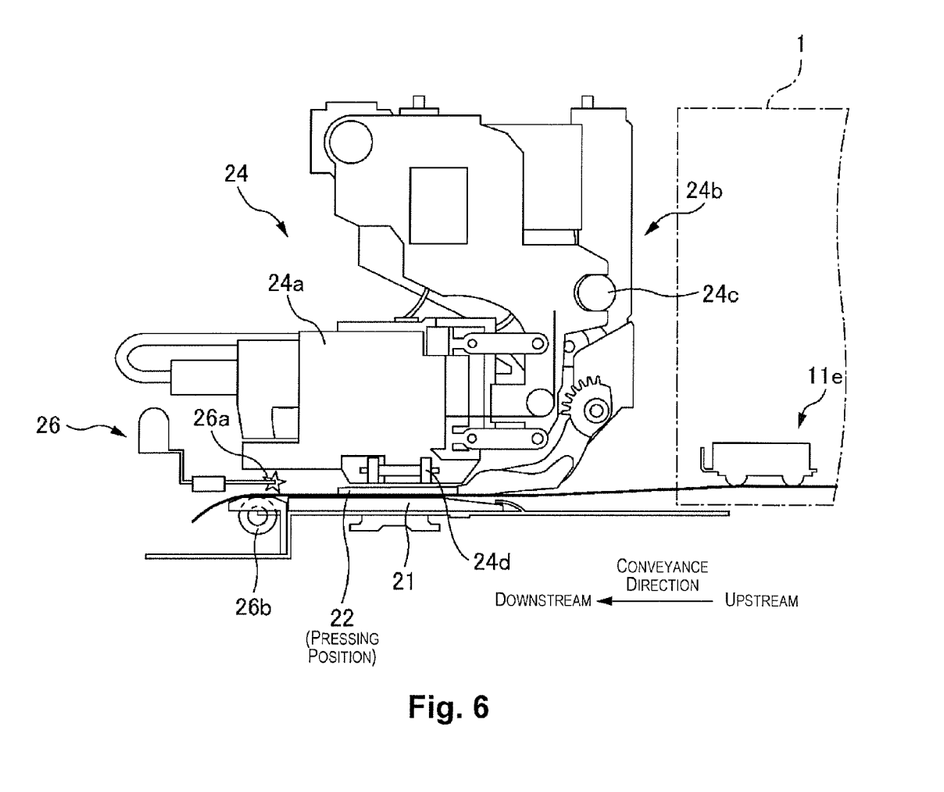
FIG. 6 is a diagram depicting a simplified schematic of a color measurement unit.

FIG. 5 is a diagram depicting a simplified schematic of a pressing mechanism. FIG. 6 is a diagram depicting a simplified schematic of a color measurement unit.

As depicted in FIGS. 5 and 6, the color measurement device 20 is provided with a conveyance guide 21, a paper pressing member 22, a pressing mechanism 23, a color measurement unit 24, a controller 25 (see FIG. 2), and a paper ejection unit 26. The conveyance guide 21 is a member for guiding the paper S being ejected from the printer 1. The paper pressing member 22 is a member that functions as a medium-pressing member for pressing the paper S of the conveyance guide 21 towards the conveyance guide 21. The pressing mechanism 23 is a mechanism for transporting the paper pressing member 22 between a pressing position (a position at which the paper pressing member 22 presses the paper S) and a retracted position (a position at which the paper pressing member 22 is retracted). The color measurement unit 24 performs color measurement of the printed pattern P printed onto the paper S. The controller 25 controls the pressing mechanism 23 and the color measurement unit 24 of the color measurement device 20. The paper ejection unit 26 ejects the paper S having undergone color measurement. Here, in the color measurement device 20, the configuration except for the color measurement unit 24 corresponds to the paper pressing device 30 for pressing the paper S with the paper pressing member 22.

The conveyance guide 21 is a member of plate form furnished to the downstream end in the conveyance direction from the paper ejection roller unit 11e of the printer 1. The conveyance guide 21 is furnished at a position slightly below the position at which the paper S is ejected from the paper ejection roller unit 11e. The conveyance guide 21 is formed with width sufficiently greater than that of the paper S in the intersection direction, and is flat at positions thereof where the paper S is conveyed, and where color measurement takes place.

The paper pressing member 22 is a member of plate form having oblong contours and disposed with the lengthwise direction thereof oriented along the intersection direction. An opening 22h (see FIG. 4) is formed along the intersection direction in the paper pressing member 22. The paper pressing member 22 is formed with width in the intersection direction that is greater than the width of the conveyed paper S. The opening 22h is slightly narrower than the width of the paper S in the intersection direction. Because of this, when the paper S conveyed over the conveyance guide 21 is pressed by the paper pressing member 22, the area of the paper S where the printed pattern P has been printed is exposed through the opening 22h.

The pressing mechanism 23 has a rotating shaft 22a, a DC motor 22b, and a gear train 22c. The rotating shaft 22a is furnished at the edge section of the upstream end of the paper pressing member 22 in the conveyance direction, with the lengthwise direction thereof oriented along the intersection direction. The rotating shaft 22a is rotatably disposed about an axis coincident with the lengthwise direction. The paper pressing member 22 is attached to the rotating shaft 22a, and as the rotating shaft 22a rotates, the paper pressing member 22 rotates about the rotating shaft 22a as its axis. The DC motor 22b is a power supply which is controlled by the controller 25 in order to rotate the rotating shaft 22a. The gear train 22c is a gear train for transmitting the power of the DC motor 22b to the rotating shaft 22a. The gear train 22c has a first gear 22d furnished at one end section of the rotating shaft 22a, and second gear 22f furnished to a motor shaft 22e. The motor shaft 22e corresponds to the output section of the DC motor 22b. The first gear 22d and the second gear 22f are set to a reduction gear ratio of approximately 1/40. The gear train 22c corresponds to a transmission section for decelerating the power of the DC motor 22b transmitted to the paper pressing member 22. In other words, the gear train 22c corresponds to a transmission section for reducing displacement of the motor shaft 22e of the DC motor 22b while displacing the paper pressing member 22, and for increasing displacement of the paper pressing member 22 while displacing the motor shaft 22e. Also, an encoder 22g is furnished as the detection section for detecting rotational displacement of the motor shaft 22e.

With the paper pressing member 22 in the retracted position, when electrical current of a predetermined direction is then supplied to the DC motor 22b, the paper pressing member 22 is transported about the rotating shaft 22a and comes to face the upper face of the conveyance guide 21, with the lower face of the paper pressing member 22 in opposition to the upper face of the conveyance guide 21. Once the paper pressing member 22 and the conveyance guide 21 are in opposition, if electrical current of the predetermined direction continues to be supplied to the DC motor 22b, there is generated pressing force (torque) whereby the paper pressing member 22 presses against the conveyance guide 21. Or, if electrical current of the reverse direction of the predetermined direction is supplied to the DC motor 22b, the paper pressing member 22 is transported about the rotating shaft 22a in the direction away from the upper face of the conveyance guide 21.

The color measurement unit 24 has a color measurement section 24a composed of a photosensor leading to the controller 25; and a color measurement section transport mechanism 24b for transporting the color measurement section 24a in the intersection direction. The color measurement section 24a has, for example, a light-emitting section and a light-receiving section, and performs color measurement on the basis of the quantity of light received by the light-receiving section, of light emitted by the light-emitting section and subsequently reflected by the printed pattern P.

In the color measurement section transport mechanism 24b, a color measurement section transport motor (not shown) for transporting the color measurement section 24a in the intersection direction transmits power to a belt (not shown) affixed to the color measurement section 24c, which is furnished in a manner enabling transport in both directions guided in the intersection direction along a guide shaft 24c. The color measurement section 24a may use a pulse motor as the color measurement section transport motor (not shown), or position control may take place utilizing an encoder or the like. Because of this, the controller can identify the sub-patterns Pa during color measurement, on the basis of the amount of transport of the color measurement section 24a.

A transport roller 24d is furnished at the bottom end of the color measurement section 24a. The transport roller 24d comes into rolling contact over the paper pressing member 22 during transport of the color measurement section 24a, and is transported over the paper pressing member 22 while guided by the paper pressing member 22. As the color measurement section 24a is transported by traveling over the paper pressing member 22 which presses the paper S, color measurement of the printed pattern P, which is exposed through the opening 22h of the paper pressing member 22, takes place. When the paper pressing member 22 releases pressure (when the paper pressing member 22 is transported to the retracted position), the color measurement section 24a retracts to a region away from that above the paper pressing member 22. Because of this, the guide shaft 24c is extended beyond the width of the paper pressing member 22 in the intersection direction, such that the color measurement section 24a can retract from above the paper pressing member 22. That is, the color measurement section 24a is transportable between a region above the paper pressing member 22 where the section is disposed during color measurement, and a region to the outside of the paper pressing member 22 in the intersection direction, where the section is disposed when color measurement is not taking place.

The processes of the controller 25 are discussed later.

The paper ejection unit 26 is composed of a pair of upper and lower rollers 26a, 26b disposed to the downstream end from the color measurement position, with the lower roller 26b being controlled by the controller 25 to convey the paper S.

Color Calibration Process

Figure 7:
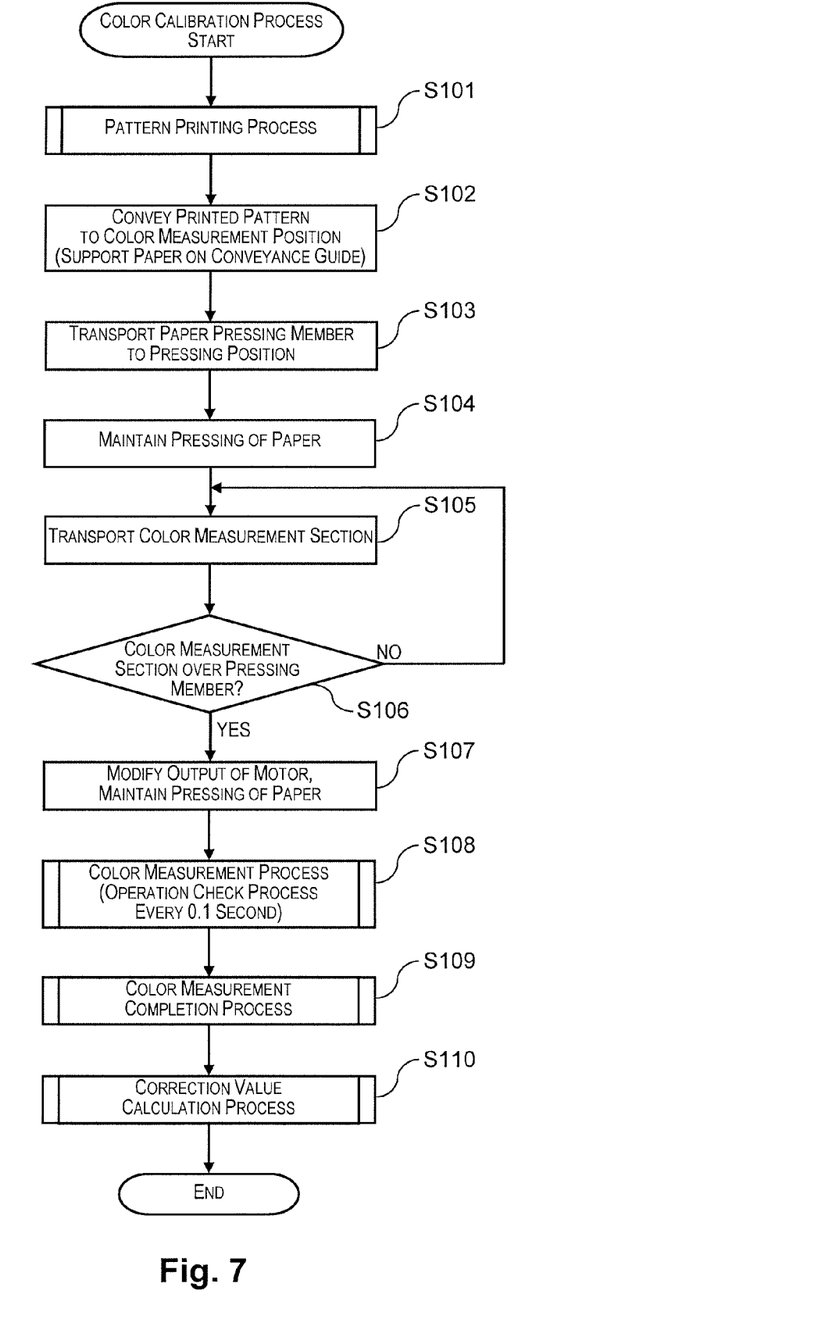
FIG. 7 is a flowchart for describing a color calibration process.

FIG. 7 is a flowchart for describing a color calibration process.

First, the printer 1 executes printing of the printed pattern P (pattern printing process, S101). Because printing of the printed pattern P can be performed by the printer 1 according to known printing techniques, a description of printing of the printed pattern P is omitted here. The printed pattern P that the printer 1 prints onto the paper S is a printed pattern P of a plurality of sub-patterns Pa lined up in the intersection direction.

Next, the printer 1 conveys the paper S until the printed pattern P of the paper S reaches the color measurement position and the paper S is supported on the conveyance guide 21 (S102). At this time, the paper pressing member 22 is in the retracted position as depicted in FIG. 5. When the printed pattern P has reached the color measurement position of the color measurement device 20, the printer 1 halts conveying of the paper S. As depicted in FIG. 5, in certain cases the conveyed paper S may float up from the conveyance guide 21. If the color measurement 24 performs color measurement of the printed pattern P in this state, there is a risk of inconsistent distance between the color measurement section 24a and the printed pattern P, so that accurate color measurement cannot take place.

Next, the color measurement device 20 transports the paper pressing member 22 to the pressing position to minimize floating of the paper S up from the conveyance guide 21 (S103). At this time, the controller 25 of the color measurement device 20 drives the DC motor 22b and transports the paper pressing member 22 from the retracted position to the pressing position (see FIG. 6). The power of the DC motor 22b is transmitted to the rotating shaft 22a via the gear train 22c, whereupon the paper pressing member 22 is transported about the rotating shaft 22a and comes to face the upper face of the conveyance guide 21, with the lower face of the paper pressing member 22 in opposition to the upper face of the conveyance guide 21. By virtue of the paper S being sandwiched between the lower face of the paper pressing member 22 and the upper face of the conveyance guide, even if the paper S curls, the printed pattern P exposed through the opening 22h of the paper pressing member 22 is corrected to a flat condition. Based on the detection results obtained from the encoder 22g, the controller 25 detects that the paper pressing member 22 has been transported to the pressing position.

Incidentally, after the paper pressing member 22 has been transported to the pressing position, if the controller 25 happens to halt the DC motor 22b, there is a risk that the paper S will push up the paper pressing member 22 so that the paper S again floats up from the conveyance guide 21. For this reason, the controller 25 continues to supply a predetermined electrical current to the DC motor 22b even after the paper pressing member 22 has been transported to the pressing position, so that the DC motor 22b continues to output power for pressing the paper pressing member 22 against the paper S. In so doing, the paper S is prevented from floating up from the conveyance guide 21.

Next, the controller 25 transports the color measurement section 24a (S105). At the time that transport starts, the color measurement section 24a is disposed in a region to the outside of the paper pressing member 22. However, as the color measurement section 24a continues to be transported (NO in S106→S105), the color measurement section 24a reaches a point above the paper pressing member 22. If the controller 25 decides that the color measurement section 24a is positioned above the paper pressing member 22 (YES in S106), it changes the power output by the DC motor 22b (S107).

The output of the DC motor 22b in S107 may be lower than the output of the DC motor 22b in S104. This is because the color measurement section 24a is above the paper pressing member 22, and the weight of the color measurement section 24a bears down on the paper pressing member 22 via the transport roller 24a and presses the paper S.

The controller 25 may vary the output of the DC motor 22b in S107 depending on the type of paper (the pressing force may be varied as well). For example, in a case of thick paper, in consideration of the strong upward pushing force of the paper S against the paper pressing member 22, the controller 25 causes the output of the DC motor 22b to be greater (the pressing force to be greater) than when thin paper is used. Also, in a case where the paper S is wide, in consideration of the strong upward pushing force of the paper S against the paper pressing member 22, the controller 25 may cause the output of the DC motor 22b to be greater than with paper of narrower width.

Next, the controller 25 executes a color measurement process while pressing the paper pressing member 22 against the paper S (S108). At this time, the controller 25 transports the color measurement section 24a over the paper pressing member 22 with the paper pressing member 22 guiding the transport roller 24d. The controller 25 then causes the color measurement section 24a to perform color measurement of the printed pattern P exposed through the opening 22h of the paper pressing member 22. Because the color measurement section 24a is transported while the transport roller 24d rolls over the paper pressing member 22 as the paper pressing member 22 presses the paper S, the distance between the color measurement section 24a and the printed pattern P is kept constant. Because of this, accurate color measurement is possible.

During the color measurement process, the controller 25 carries out an operation check process every 0.1 second. In this operation check process, a check of termination of the color measurement process and an operation check of the motor 22b are carried out. The operation check process will be discussed later.

After termination of the color measurement process, the controller 25 executes a color measurement completion process (S109). Specifically, the controller 25 transports the color measurement section 24a to a region outside the paper pressing member 22, transports the paper pressing member to the retracted position, and thereafter ejects the paper S.

Finally, on the basis of the color measurement results acquired in the color measurement process (S108), the control section 10 of the printer 1 calculates correction values for color calibration, and stores these in the memory 10c (S110). It is possible for the correction value calculation process to be performed using known color calibration techniques, and therefore a discussion is omitted here.

Operation Check Process

Figure 8:
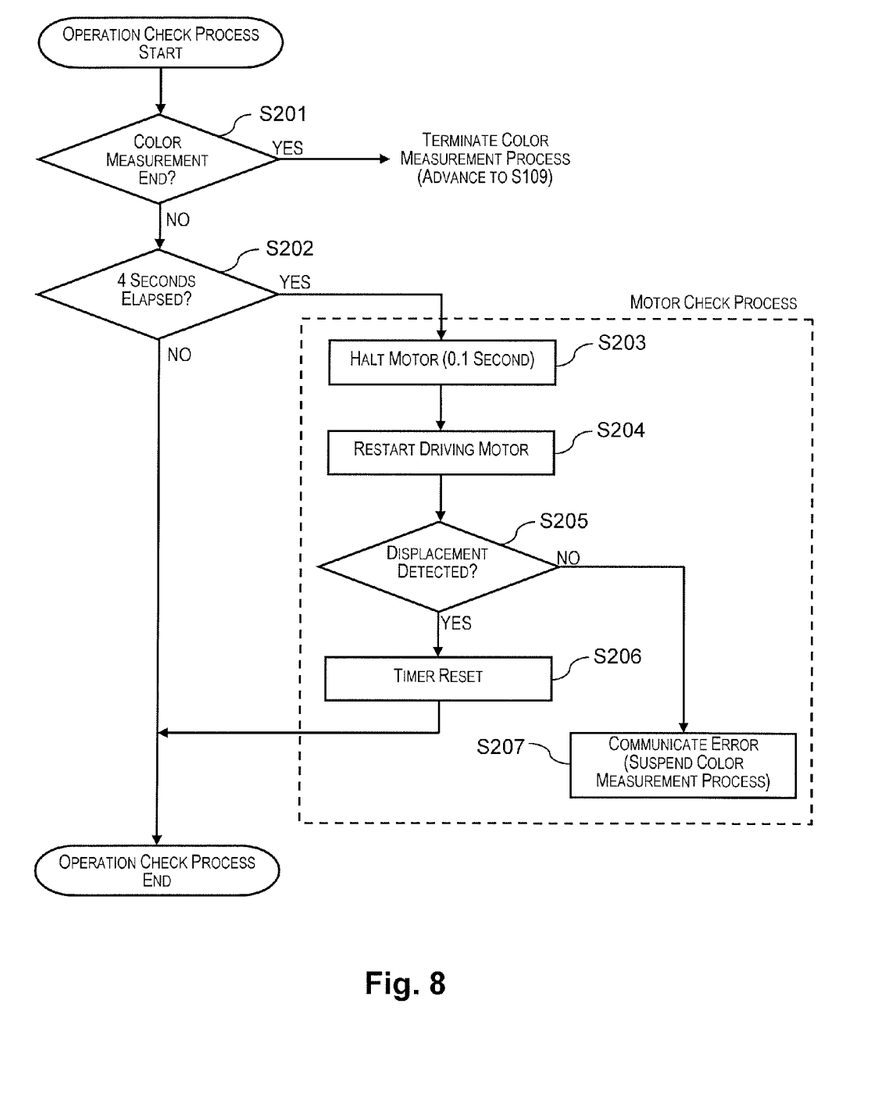
FIG. 8 is a flowchart for describing an operation check process.

FIG. 8 is a flowchart for describing the operation check process. As described previously, this operation check process is executed each 0.1 second during the color measurement process (S108 of FIG. 7). Through this operation check process, a color measurement process termination decision is carried out every 0.1 second, and a decision as to whether the motor is operating normally (motor check process) is carried out every 4 seconds.

First, the controller 25 carries out a decision as to whether the color measurement process has terminated (S201). When color measurement of all of the sub-patterns Pa of the printed pattern P in S108 has terminated, a termination flag is set; and if a termination flag is set at the time of the decision of S201, the controller 25 decides that the color measurement process has terminated (YES in S201). If a termination flag is not set at the time of the decision of S201 (NO in S201), the controller 25 decides that the color measurement process is still in progress.

Next, the controller 25 decides whether 4 seconds has elapsed since the color measurement process started (or since a timer was last reset in S206, discussed later). If 4 seconds has not yet elapsed (NO in S202), the controller 25 terminates the operation check process and proceeds with the color measurement process. If 4 seconds has passed (YES in S202), the controller 25 carries out the motor check process (S203 to S207). In so doing, the motor check process is carried out every 4 seconds during the interval that the color measurement process is being carried out.

Here, before describing the specific processes of the motor check process, the need for a motor check process every 4 seconds is described.

Figures 9A, 9B:
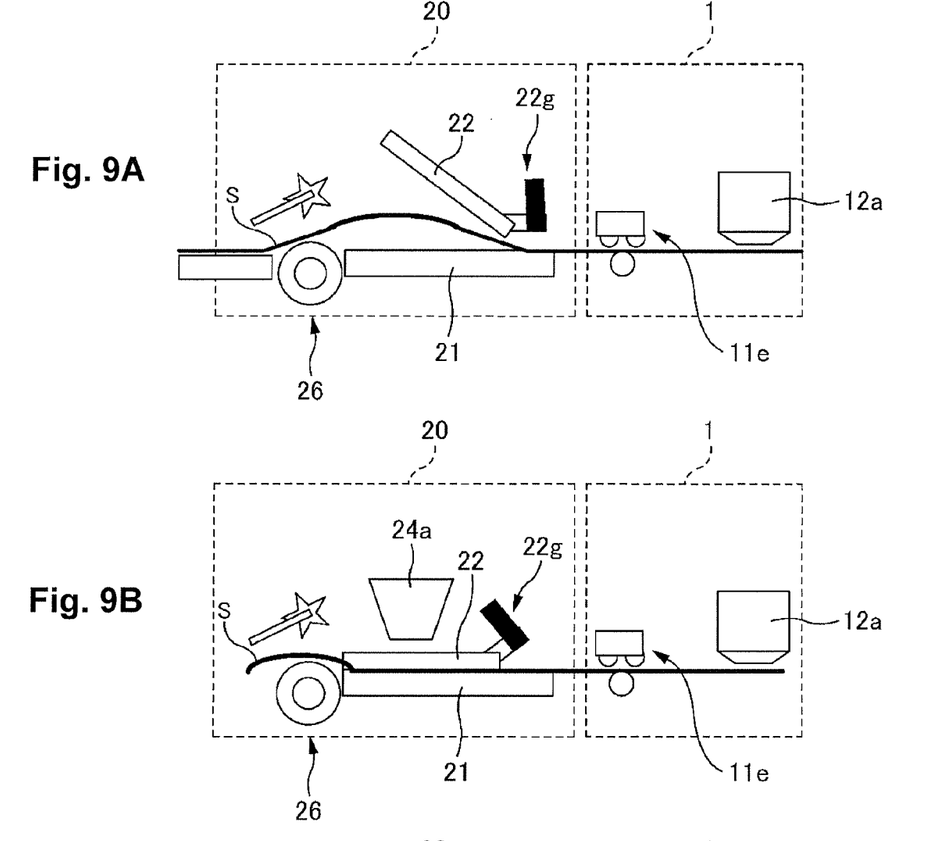
FIG. 9A is a schematic drawing depicting a state in which a paper pressing member is disposed in the retracted position.
FIG. 9B is a schematic drawing depicting a state in which paper is pressed with the paper pressing member.
Figure 9C:
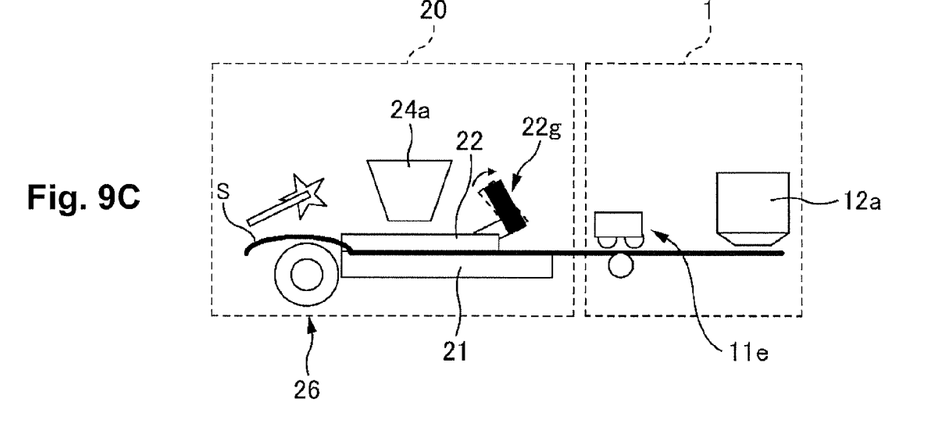
FIG. 9C a drawing depicting a state in which supply of electrical current to a DC motor has halted in a state of pressing by the paper pressing member.

FIG. 9 (a) is a schematic drawing depicting a state in which the paper pressing member is disposed in the retracted position. FIG. 9(b) is a schematic drawing depicting a state in which paper is pressed with the paper pressing member. FIG. 9(c) is a drawing depicting a state in which supply of electrical current to the DC motor has halted in a state of pressing by the paper pressing member. Here, in FIG. 9(c), an image of the encoder 22g in a state of pressing by the paper pressing member 22 is depicted by dot-and-dash lines, and an image of the encoder 22g when electrical current supplied to the DC motor 22b has been reduced is depicted by solid lines.

When the paper pressing member 22 is transported from the retracted position of FIG. 9(a) to the pressing position of FIG. 9(b) (S103 of FIG. 7), because the motor shaft 22e of the DC motor 22b rotates in association with transport of the paper pressing member 22, it is possible for the encoder 22g to detect the amount of rotational displacement of the motor shaft 22e. In contrast to this, when the paper pressing member 22 is continuing to press the paper S at the pressing position of FIG. 9(b) (S107 and S108 of FIG. 7), even if the DC motor 22b continues to output power, because the paper pressing member 22 is not transported the motor shaft 22e does not rotate either, and therefore the encoder 22g does not detect the amount of rotational displacement of the motor shaft 22. As a result, when the paper pressing member 22 continues to press the paper S at the pressing position of FIG. 9(b) (S107 and S108 of FIG. 7), the controller 25 cannot make a decision regarding malfunction of the DC motor 22b on the basis of detection results obtained from the encoder 22g. Accordingly, in the present embodiment, the controller 25 makes a decision regarding malfunction of the DC motor 22b by executing the motor check process.

Also, because the color measurement device 20 is furnished as an option of the printer 1, it is necessary for it to operate without interfering with control of the printer 1. As discussed previously, the printer 1 is configured such that, in cases that a given operation of a device connected via the interface section 10a or of an internal electronic component of the printer 1, such as the motor, is detected to have continued for 30 seconds, error information is communicated, and control of the printer 1 is halted. In cases where the printed pattern P for color measurement by color measurement device 20 is large or where there are a large number of sub-patterns Pa, the color measurement process could take 30 seconds or more in some instances. At this time, if the DC motor 22b continues to operate continuously for 30 seconds or more during the color measurement process, there is a risk that control of the printer 1 will be halted. Accordingly, in the present embodiment, the motor check process is executed every 4 seconds in a cycle shorter than 30 seconds, and the electrical current supplied to the DC motor 22b is reduced during the motor check process, whereby the DC motor 22b is prevented from operating continuously for 30 seconds or more.

Next, the processes of the motor check process are described.

First, the controller 25 halts the supply of electrical current to the DC motor 22b and brings output of the DC motor 22b to a halt (S203). In so doing, the power output by the DC motor 22b goes into a reduced state, as compared with the state of FIG. 9(b). In FIG. 9(b), because the DC motor 22b continues to output power in a state in which the paper pressing member 22 is not transported, slight elastic deformation arises in the paper pressing member 22 and in the pressing mechanism 23; however, once output of the DC motor 22b halts (is reduced), the paper pressing member 22 and the pressing mechanism 23 recover from elastic deformation. As a result, as depicted in FIG. 9(c), despite the fact that the paper pressing member 22 remains disposed at the pressing position without being transported, the motor shaft 22e experiences rotational displacement in the opposite direction from the pressing direction. Further, because of a configuration whereby the output of the DC motor 22b is decelerated for transmission to the paper pressing member 22 via the gear train 22c, even if the amount of elastic deformation of the paper pressing member 22 and the pressing mechanism 23 is slight, the amount of rotational displacement of the motor shaft 22e in the state of FIG. 9(c) is amplified by the gear train 22c.

As depicted in FIG. 9(c), during S203, because the color measurement section 24a rests over the paper pressing member 22, even if the DC motor 22b is no longer outputting power for the purpose of causing the paper pressing member 22 to press the paper S, the weight of the color measurement section 24a bears down on the paper pressing member 22 via the transport roller 24d. Because of this, the paper pressing member 22 does not float up from the paper S, and a state in which the paper S is pressed is maintained. In so doing, the motor check process can be executed while the color measurement section 24a is carrying out the color measurement process to carry out the color measurement of the printed pattern P.

Next, after the output of the DC motor 22b has been halted for 0.1 second, the controller 25 resumes supplying electrical current to the DC motor 22b, and restarts driving of the DC motor 22b (S204). At this time, the system returns from the state of FIG. 9(c) to the state of FIG. 9(b). That is, the paper pressing member 22 and the pressing mechanism 23 again experience elastic deformation, due to the DC motor 22b continuing to output power in a state in which the paper pressing member 22 is not transported. As a result, despite the fact that the paper pressing member 22 remains disposed at the pressing position without being transported, the motor shaft 22*e* experiences rotational displacement in the pressing direction. In particular, because of a configuration whereby the output of the DC motor 22*b* is decelerated for transmission to the paper pressing member 22 via the gear train 22*c*, even if the amount of elastic deformation of the paper pressing member 22 and the pressing mechanism 23 is slight, the amount of rotational displacement of the motor shaft 22*e* is relatively great.

Thus, on the basis of detection results obtained from the encoder 22*g*, the controller 25 decides whether the motor shaft 22*e* has experienced rotational displacement in the pressing direction (S205). In the case that rotational displacement of the motor shaft 22*e* is detected (YES in S205), the controller 25 resets to 0 second the timer that was used in S202 for the decision as to whether 4 seconds elapsed (S206). In so doing, the controller 25 again executes the motor check process after 4 seconds has elapsed from the process of S206 (YES in S202).

On the other hand, in a case where rotational displacement of the motor shaft 22*e* is not detected (NO in S205), because it is conceivable that DC motor 22*b* is not outputting power normally, the controller 25 communicates an error through a buzzer or display in the printer 1 (S207).

In the decision of S205, it may be decided whether the motor shaft 22*e* has experienced rotational displacement in the pressing direction equal to or greater than a threshold value. In this case, the controller 25 may modify the threshold value setting according to the type of paper. For example, in the case of thick paper, owing to stronger upward pushing force of the paper S against the paper pressing member 22 and the resultant stronger output of the DC motor 22*b* (stronger pressing force), the controller 25 may set a larger threshold value as compared with the case of thin paper. Also, in a case where the paper S is wide, owing to stronger upward pushing force of the paper S against the paper pressing member 22 and the resultant stronger output of the DC motor 22*b* (stronger pressing force), the controller 25 may set a larger threshold value, as compared with the case of paper of narrow width.

According to the paper pressing device 30 of the present embodiment, the paper S is supported on the conveyance guide 21 (S102), and after the paper pressing member 22 is transported to the pressing position (S103), power continues to be output from the DC motor 22*b* and the paper pressing member 22 continues to press the paper S towards the conveyance guide 21 (S104, S107). However, in this state the motor shaft 22*e* does not rotate, and therefore the controller 25 cannot make a decision regarding malfunction of the DC motor 22*b* on the basis of detection results obtained from the encoder 22*g*. Accordingly, in the present embodiment, in a state with the paper pressing member 22 having pressed the paper towards the conveyance guide 21, the controller 25 halts output of power by the DC motor 22*b* (S203), and utilizing the fact that the motor shaft 22*e* experiences rotational displacement in the opposite direction from the pressing direction at this time, detects a malfunction of the DC motor 22*b* on the basis of detection results obtained from the encoder 22*g* (S205, S207). In so doing, malfunctioning of the DC motor 22*b* can be detected using the encoder 22*g*, in a state with the paper pressing member 22 disposed at the pressing position.

According to the present embodiment, the paper pressing device 30 has a gear train 22*c* which decelerates the power of the DC motor 22*b* transmitted to the paper pressing member 22. When output of the DC motor 22*b* is halted and elastic deformation of the paper pressing member 22 and the pressing mechanism 23 recovers, the amount of rotational displacement of the motor shaft 22*e* is amplified by the gear train 22*c*. In so doing, notwithstanding the fact that the amount of elastic deformation of the paper pressing member 22 and the pressing mechanism 23 is slight, the amount of rotational displacement of the motor shaft 22*e* is relatively great, and rotational displacement of the motor shaft 22*e* is easily detected by the encoder 22*g*.

Also, according to the present embodiment, the paper pressing member 22 is caused to press the paper S while the controller 25 is performing color measurement of the printed pattern P with the color measurement section 24*a*. In so doing, any incidence of the paper S floating up from the conveyance guide 21 can be minimized, and color measurement can take place accurately.

Also, according to the present embodiment, the color measurement section 24*a* rests over the paper pressing member 22 while the color measurement section 24*a* performs color measurement of the printed pattern P. Because the color measurement process is carried out in a state with the color measurement section 24*a* resting over the paper pressing member 22 while the paper pressing member 22 presses the paper S, the distance between the color measurement section 24*a* and the printed pattern P is kept constant, and accurate color measurement is possible.

Also, according to the present embodiment, the controller 25 halts output of the DC motor 22*b* when the color measurement section 24*a* is resting over the paper pressing member 22. At this time, because the weight of the color measurement section 24*a* bears down on the paper pressing member 22, the paper pressing member 22 does not float up from the paper S, and a state in which the paper S is pressed can be maintained.

Also, according to the present embodiment, the controller 25 halts output of the DC motor 22*b* (executes the motor check process) while color measurement of the printed pattern P by the color measurement section 24*a* is taking place (while the color measurement process is being executed), and therefore the color measurement process can be completed quickly. In the present embodiment, because the weight of the color measurement section 24*a* bears down on the paper pressing member 22, it is possible for the motor check process to be executed while the color measurement process is being executed. If the color measurement process were interrupted during each motor check process, completion of the color measurement process would be delayed.

Modified Examples

In the motor check process of the aforedescribed embodiment, the controller 25 detects malfunction of the DC motor 22*b* on the basis of detection results obtained from the encoder 22*g* (S205) after first halting output of the DC motor 22*b* (S203) and restarting driving of the DC motor 22*b* (S204). However, the timing of malfunction detection on the basis of detection results obtained from the encoder 22*g* is not limited to this.

Figure 10:
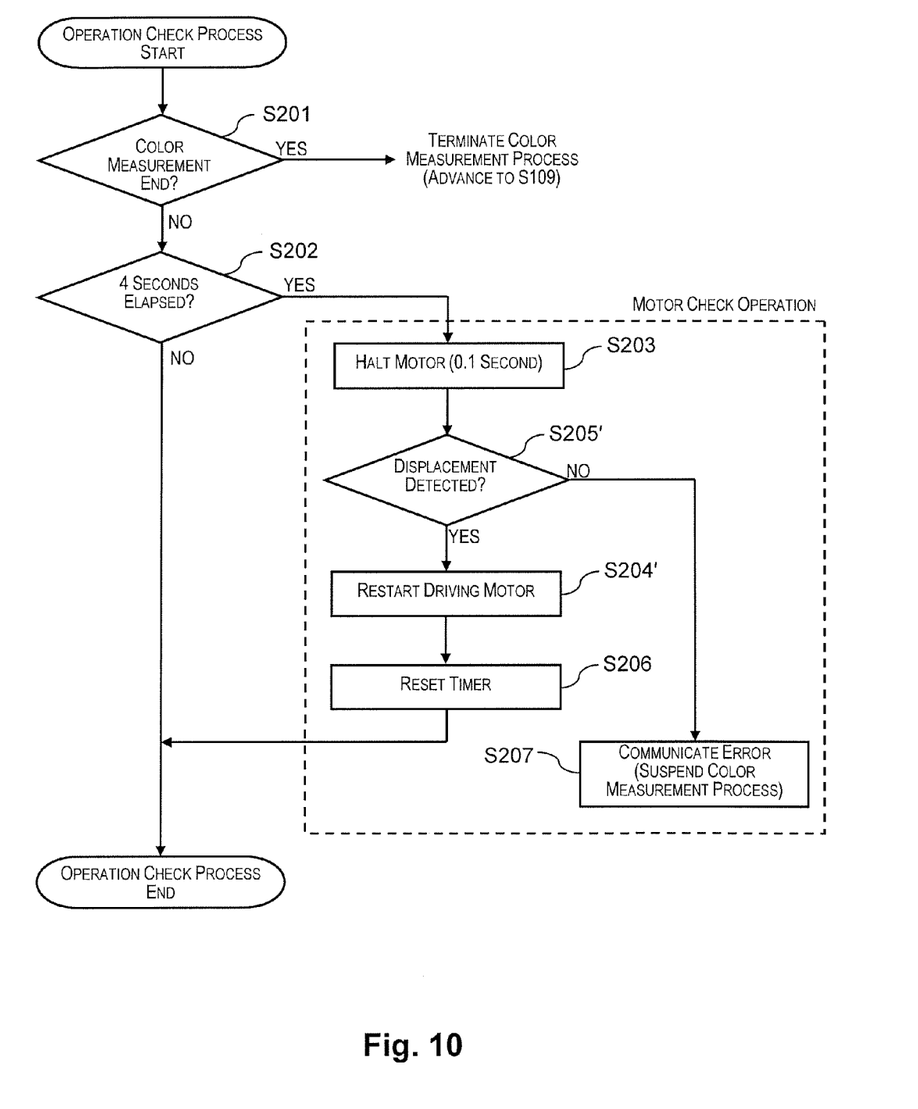
FIG. 10 is a flowchart for describing an operation check process of a modified example.

FIG. 10 is a flowchart for describing an operation check process of a modified example. As compared with FIG. 8, this modified example differs in that malfunction of the DC motor 22*b* is detected on the basis of detection results obtained from the encoder 22*g*, prior to restarting driving of the DC motor 22*b*.

As was described already, once output of the DC motor 22*b* is halted in S203, the paper pressing member 22 and the pressing mechanism 23 recover from elastic deformation, and the motor shaft 22*e* experiences rotational displacement in the opposite direction from the pressing direction. Thus, in the modified example, immediately after output of the DC motor 22*b* is halted in S203, the controller 25 decides whether the motor shaft 22*e* has experienced rotational displacement in the opposite direction from the pressing direction (S205'). If the motor shaft 22e has not experienced rotational displacement in the opposite direction from the pressing direction (NO in S205'), it is conceivable that the DC motor 22b has not been operating normally since before output of the DC motor 22b was halted, and that the paper pressing member 22 may not be pressing the paper S normally, and therefore the controller communicates an error (S207).

In S205', a decision is made as to whether the motor shaft 22e has experienced rotational displacement equal to or greater than a threshold value, in the opposite direction from the pressing direction. In this case, the controller 25 may modify the threshold value setting according to the type of paper. For example, in the case of thick paper, owing to stronger upward pushing force of the paper S against the paper pressing member 22 and the resultant stronger output of the DC motor 22b (stronger pressing force), the controller 25 may set a larger threshold value as compared with the case of thin paper. Also, in a case where the paper S is wide, owing to stronger upward pushing force of the paper S against the paper pressing member 22 and the resultant stronger output of the DC motor 22b (stronger pressing force), the controller 25 may set a larger threshold value, as compared with the case of paper of narrow width.

According to the modified example, during the color measurement process (S108) it can be directly determined whether the paper S was being pressed.

The controller 25 may also detect malfunction of the DC motor 22b on the basis of both results of detection by the encoder 22g immediately after the DC motor 22b halts (prior to restarting driving) and results of detection by the encoder 22g after restarting driving.

Alternative Embodiment

In the aforedescribed embodiment, there was described an example of a paper pressing device which is a device furnished to a color measurement device 20 and adapted to press paper P with a paper pressing member 22 of plate form, but no limitation is imposed thereby.

Figure 11:
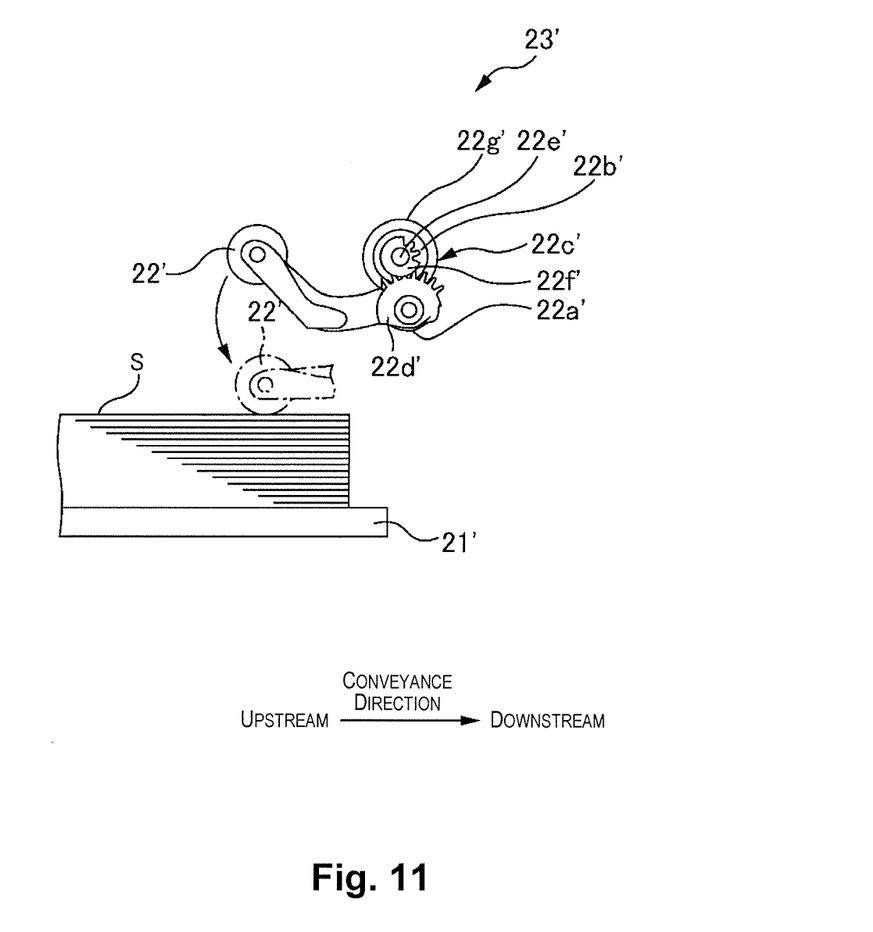
FIG. 11 is a diagram depicting a simplified schematic of an alternative embodiment.

FIG. 11 is a diagram depicting a simplified schematic of a paper pressing device according to an alternative embodiment. In this embodiment, the paper pressing device is furnished to a paper supply device of a printer or the like.

The paper supply device is provided with a paper supply tray 21', a paper supply roller 22', a pressing mechanism 23', and a controller, not shown. The paper supply tray is a member for containing stacked paper. The paper supply roller 22' is a member for pressing the paper towards the paper supply tray 21'. This paper supply roller 22' contacts the uppermost sheet of the paper stored in the paper supply tray 21'. The pressing mechanism 23' is a mechanism for transporting the paper supply roller 22' between a pressing position (a position with the paper supply roller 22' pressing the paper S) and a retracted position (a position with the paper supply roller 22' retracted). The pressing mechanism 23 is controlled by the controller, not shown.

The paper supply roller 22' is a member of roller form. In a state with the paper supply roller 22' at the pressing position, the uppermost sheet of the paper stored in the paper supply tray 21' is supplied into the printer by rotation of the paper supply roller 22'.

The pressing mechanism 23' has a rotating shaft 22a', a DC motor 22b', and a gear train 22c'. The gear train 22c' is a gear train for transmitting the power of the DC motor 22b' to the rotating shaft 22a'. The gear train 22c' has a first gear 22d' and second gear 22f. The configuration of the pressing mechanism 23' is substantially similar to that of the pressing mechanism 23 of the embodiment discussed previously, and therefore a description is omitted here. Also, an encoder 22g' is furnished as a detection section for detecting the amount of rotational displacement of the motor shaft 22e'.

If the paper supply roller 22' were constantly pressed against the paper, the area of the paper S contacted by the paper supply roller 22' might experience deformation, or oils on the paper supply roller 22' might soil the paper, so normally the roller is positioned at the retracted position. However, when the paper S is to be supplied into the printer, the paper supply roller 22' is positioned at the pressing position, pressing against the paper S.

When the paper supply roller 22' continues to press against the paper S at the pressing position, even if the DC motor 22b continues to output power, because the paper supply roller 22' is not transported, the motor shaft 22e' does not rotate either, and therefore the encoder 22g' does not detect the amount of rotational displacement of the motor shaft 22. As a result, when the paper supply roller 22' continues to press against the paper S at the pressing position, the controller cannot make a decision regarding malfunction of the DC motor 22b' on the basis of detection results obtained from the encoder 22g'.

Accordingly, in the paper supply device of the present embodiment, a process comparable to the motor check process discussed previously may be executed to detect malfunction of the motor.

Other

While the aforedescribed embodiment primarily sets forth a color measurement device 20 provided with a paper pressing device 30, disclosure of a method of assessing the state of pressing of paper is included as well. The aforementioned embodiment is intended merely to aid in understanding of the invention, and should not be construed as limiting the invention. Modifications and improvements to the invention may be contemplated without departing from the spirit thereof, and such equivalents will naturally be included within the scope of the invention.

Whereas the aforedescribed embodiment described an example in which the color measurement section transport motor and the DC motor 22b are deliberately halted at 4-second intervals during the color measurement process, there is no limitation thereto, and it is sufficient to set operation such that there is no interference with control of the printer 1. Therefore, in cases where, as in the aforementioned printer 1, the system is set so as to communicate error information in cases where it is detected that a given operation of a device connected via the interface section 10a or of an internal electronic component of the printer 1, such as the motor, has continued for a predetermined time, the color measurement section transport motor or the DC motor 22b may be halted at a time that is shorter than the set predetermined time.

Also, the time for halting the color measurement section transport motor or the DC motor 22b is not limited to 0.1 second. Also, the quantity of electrical current supplied to the DC motor may be reduced, rather than halting the supply of electrical current to the DC motor 22b. If the electrical current supplied to the DC motor 22b is reduced, the power output from the DC motor 22b is reduced as well. At this time, because the paper pressing member 22 and the pressing mechanism 23 recover from elastic deformation, it is possible to detect malfunction of the DC motor 22b on the basis of results of detection by the encoder 22g. That is, even if the quantity of electrical current supplied to the DC motor is reduced instead of halting the supply of electrical current to the DC motor 22b, it is nevertheless possible to detect malfunction of the DC motor 22b on the basis of results of detection by the encoder 22g.

In a case where the power output from the DC motor is reduced instead of the DC motor being halted, the controller 25 may modify the amount by which power output from the DC motor is reduced, according to the type of paper. For example, in the case of thin paper, in consideration of the weaker upward pushing force of the paper against the paper pressing member 22, the controller 25 may cause the amount by which the power output decreases to be greater than with the case of thick paper. In the case of paper of narrow width, in consideration of the weaker upward pushing force of the paper against the paper pressing member 22, the controller 25 may cause the amount by which the power output decreases to be greater than with the case of paper of greater width.

In the aforedescribed embodiment, the power supply for outputting power for the purpose of pressing the medium is a DC motor, but no limitation is imposed thereby. For example, instead of a motor that outputs force in a rotational direction, the power supply may be an actuator that outputs force in a linear direction. In this case, a linear encoder for measuring displacement in a linear direction may be used as the detection section for detecting the output section of the power supply.

Further, whereas in the aforedescribed embodiment, the power supply is a motor, no limitation is imposed thereby. For example, hydraulic pressure type power supplies are acceptable, as are power supplies that utilize heat, steam, or gases.

The medium that is pressed by the pressing device is not limited to paper. For example, cloth, sheet steel, or the like are acceptable as well.

What is claimed is:

1. A medium-pressing device comprising:
   a pressing member that presses a medium;
   a pressing mechanism including a power supply that outputs power for the pressing member to press the medium, the power supply including an output section coupled to the pressing member;
   a detection section that detects displacement of the output section of the power supply; and
   a controller that determines that a malfunction of the power supply has occurred when the detection section detects no displacement of the output section of the power supply when the power output from the power supply is reduced in a state in which the pressing member keeps pressing the medium.

2. The medium-pressing device according to claim 1, wherein
   the medium-pressing device includes a transmission section that reduces the power of the power supply and transmitting the power to the pressing member.

3. The medium-pressing device according to claim 1, wherein
   the medium-pressing device includes a transmission section that reduces displacement of the output section of the power supply while displacing the pressing member, and that increases displacement of the pressing member while displacing the output section.

4. The medium-pressing device according to claim 1, wherein
   the medium-pressing device is furnished to a color measurement device which is provided with a color measurement section that performs color measurement of a printed pattern printed onto the medium; and
   the controller causes the pressing member to press the medium when color measurement of the printed pattern is performed by the color measurement section.

5. The medium-pressing device according to claim 4, wherein
   the color measurement section rests on the pressing member when color measurement of the printed pattern is performed by the color measurement section.

6. The medium-pressing device according to claim 5, wherein
   while the color measurement section is resting on the pressing member, the controller reduces the power output by the power supply for the purpose of detecting a malfunction of the power supply.

7. The medium-pressing device according to claim 6, wherein
   while the color measurement section is performing color measurement of the printed pattern, the controller reduces the power output by the power supply for the purpose of detecting a malfunction of the power supply.

8. A method for detecting a malfunction, comprising:
   causing a medium to be pressed by a pressing member coupled to an output section of a power supply using power output by the power supply;
   reducing the power output from the power supply in a state in which the pressing member keeps pressing the medium;
   determining that a malfunction of the power supply has occurred when no displacement of the output section of the power supply is detected when the power output is reduced in the state in which the pressing member keeps pressing the medium.

9. The medium-pressing device according to claim 1, wherein
   when the power from the power supply is reduced in the state in which the pressing member keeps pressing the medium, at least one of the pressing member and the pressing mechanism is elastically deformed.

10. The method for detecting a malfunction according to claim 8, wherein
    when the power from the power supply is reduced in the state in which the pressing member keeps pressing the medium, at least one of the pressing member and the pressing mechanism is elastically deformed.

* * * * *